(No Model.)
J. J. BLACK.
VEHICLE FIFTH WHEEL.
No. 423,590. Patented Mar. 18, 1890.
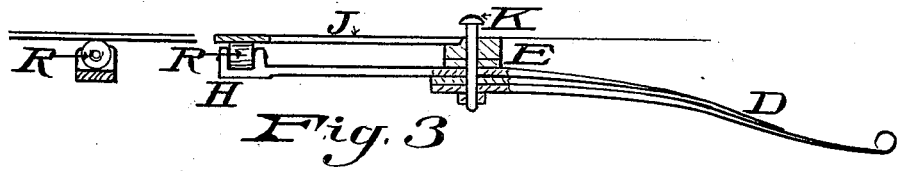
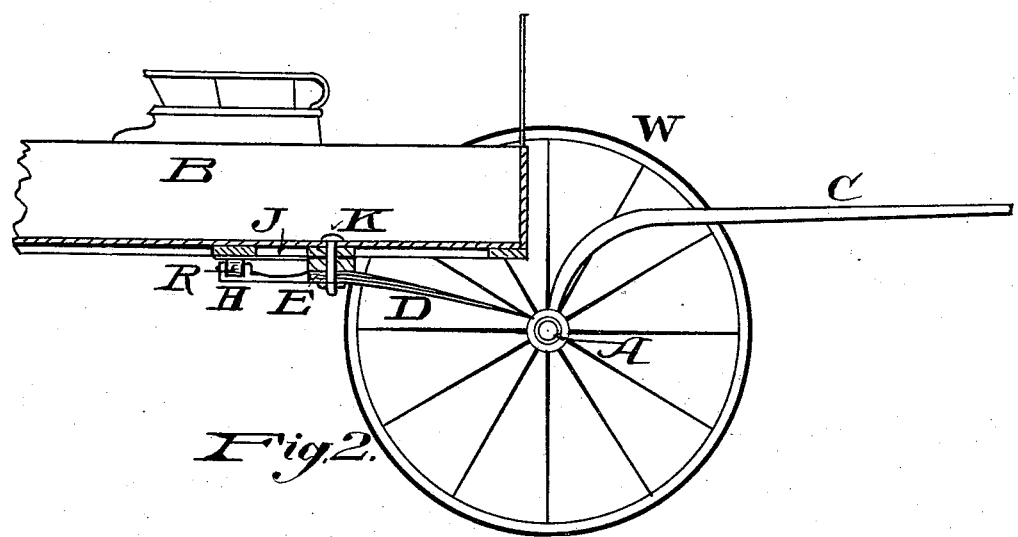
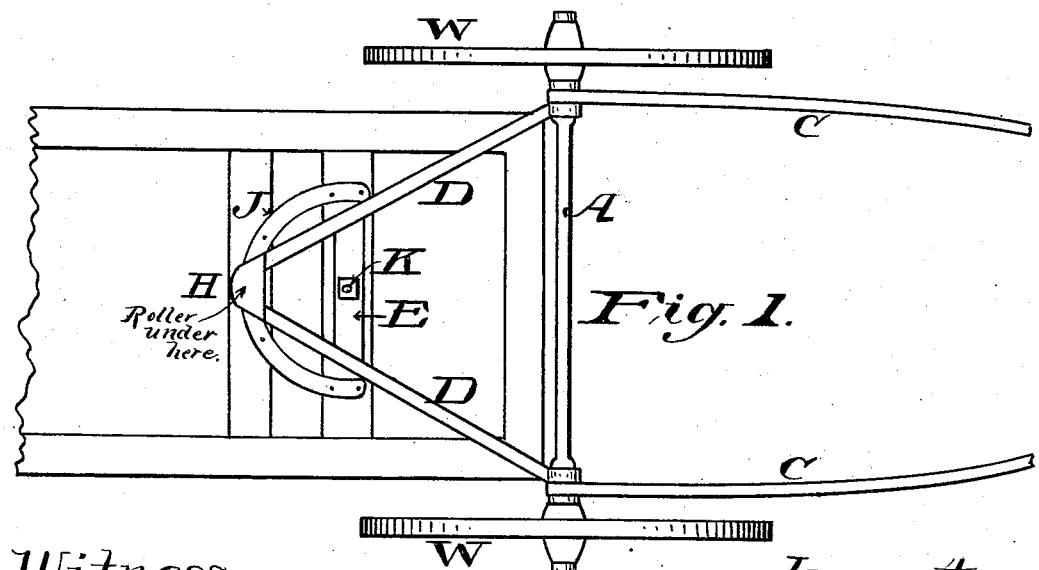
Witness,
Louis H. E. Powell
Abner Slutz
Inventor,
John J. Black,
By Geo. W. Tibbitts Atty.

UNITED STATES PATENT OFFICE.

JOHN J. BLACK, OF CLEVELAND, OHIO, ASSIGNOR TO THE BLOCK SPRING AND GEAR COMPANY, OF OHIO.

VEHICLE FIFTH-WHEEL.

SPECIFICATION forming part of Letters Patent No. 423,590, dated March 18, 1890.

Application filed November 25, 1889. Serial No. 331,586. (No model.)

*To all whom it may concern:*

Be it known that I, JOHN J. BLACK, a citizen of the United States, residing at Cleveland, in the county of Cuyahoga and State of Ohio, have invented certain new and useful Improvements in Fifth-Wheels for Road-Wagons, of which the following is a specification.

This invention relates to fifth-wheels for road-wagons; and it consists in the novel construction and combination of parts comprising such mechanism, as hereinafter described, and pointed out in the claims.

In the accompanying drawings, Figure 1 is an under side view of a wagon, showing my invention. Fig. 2 is a longitudinal section of the same, and Fig. 3 is an enlarged sectional view of the fifth-wheel and springs.

A represents the front axle, and B the body, of a road-wagon; and C C are the shafts or thills.

D D are springs attached to the axle A next to the hubs of the wheels W by suitable means. The rear ends of the springs are joined to a head H, provided with a friction-roller R, and the springs are also joined to a cross-bar E, through the middle of which the king-bolt K passes and connects the same with the body B.

J is a semicircular bar attached to the cross-sills of wagon-body, upon which the roller R traverses whenever the axle is turned.

Having described my invention, I claim—

1. The springs D D, having their rear ends joined together by a head H and provided with roller R, and the cross-bar E, also joining the springs and forming a continuous support for the front of body B, substantially as described.

2. The combination, with axle A and body B, of the springs D D, joined at their rear ends by a head H, having roller R, riding on curved bar J, and a cross-bar E, connected to the body by king-bolt K, substantially as described.

JOHN J. BLACK.

Witnesses:
GEO. W. TIBBITTS,
JOHN W. TAYLOR.